(12) United States Patent
Masina et al.

(10) Patent No.: US 6,898,950 B2
(45) Date of Patent: May 31, 2005

(54) SET OF JEWELRY

(76) Inventors: Claire Masina, Birnenweg 6, CH-5707 Seengen (CH); Roberto Masina, Birnenweg 6, CH-5707 Seengen (CH)

(*) Notice: Subject to any disclaimer, the term of this patent is extended or adjusted under 35 U.S.C. 154(b) by 92 days.

(21) Appl. No.: 10/078,150

(22) Filed: Feb. 19, 2002

(65) Prior Publication Data

US 2002/0073732 A1 Jun. 20, 2002

Related U.S. Application Data

(63) Continuation of application No. PCT/IB00/01068, filed on Jun. 28, 2000.

(30) Foreign Application Priority Data

Aug. 19, 1999 (AT) .................................. 1430/99

(51) Int. Cl.[7] ........................... A44C 13/00; A44C 15/00
(52) U.S. Cl. ........................... 63/29.1; 63/1.11; 63/1.16; 63/40
(58) Field of Search .................... 63/1.11, 1.16, 63/12, 13, 29.1, 40

(56) References Cited

U.S. PATENT DOCUMENTS

| | | | | |
|---|---|---|---|---|
| 263,755 A | * | 9/1882 | Braverman ..................... | 63/12 |
| 2,691,846 A | * | 10/1954 | Fruhling ....................... | 446/394 |
| 2,778,136 A | * | 1/1957 | Belgard ........................ | 351/52 |
| 2,803,994 A | * | 8/1957 | De Angelis et al. .......... | 351/52 |
| 3,192,737 A | | 7/1965 | Schechter et al. | |
| 3,831,398 A | * | 8/1974 | Davis, Sr. ..................... | 63/14.9 |
| 3,905,525 A | * | 9/1975 | Kawamata .................... | 224/245 |
| 4,353,225 A | | 10/1982 | Rogers | |
| 4,630,453 A | * | 12/1986 | Burkett ......................... | 63/12 |
| 4,817,064 A | * | 3/1989 | Milles .......................... | 368/282 |
| 4,959,890 A | * | 10/1990 | Pazurek ................. | 24/113 MP |
| 4,982,580 A | * | 1/1991 | Otenbaker ................. | 63/1.16 |
| 5,023,978 A | | 6/1991 | Thompson et al. | |
| 5,044,175 A | | 9/1991 | Razza | |
| 5,048,310 A | * | 9/1991 | Riley ............................ | 63/13 |
| 5,048,311 A | | 9/1991 | Mastrobuono | |
| 5,097,679 A | * | 3/1992 | Johnson et al. ............... | 63/33 |
| 5,355,698 A | * | 10/1994 | Edmark ...................... | 63/29.1 |
| 5,456,095 A | * | 10/1995 | Tawil et al. ................. | 63/29.1 |
| 5,505,061 A | * | 4/1996 | Fleury, Jr. et al. ........... | 63/29.1 |
| 5,583,584 A | | 12/1996 | Friedman | |
| 5,622,061 A | * | 4/1997 | Sakata ........................... | 63/12 |
| 5,819,557 A | * | 10/1998 | Bonchek ..................... | 63/29.1 |
| 6,131,408 A | * | 10/2000 | Gill ............................. | 63/15.8 |
| 6,580,356 B1 | * | 6/2003 | Alt et al. ..................... | 340/5.8 |
| 2002/0073732 A1 | * | 6/2002 | Masina et al. ............... | 63/1.11 |

FOREIGN PATENT DOCUMENTS

| | | | | |
|---|---|---|---|---|
| DE | 299 18 218 | * | 1/2000 | |
| JP | 407289324 A | * | 11/1995 | ........... A44C/27/00 |
| WO | WO 01/13753 | * | 3/2001 | |

* cited by examiner

*Primary Examiner*—Robert J. Sandy
*Assistant Examiner*—Katherine Mitchell
(74) *Attorney, Agent, or Firm*—Laurence A. Greenberg; Werner H. Stemer; Ralph E. Locher

(57) ABSTRACT

The set of jewelry contains at least one ring and a plurality of stud earrings as well as other pieces of jewelry, such as a necklace and a bangle. The ring as well as the necklace and the bangle are each formed with one or more bores into which one of the stud earrings can be inserted and is retained releasably therein.

12 Claims, 8 Drawing Sheets

FIG. 1
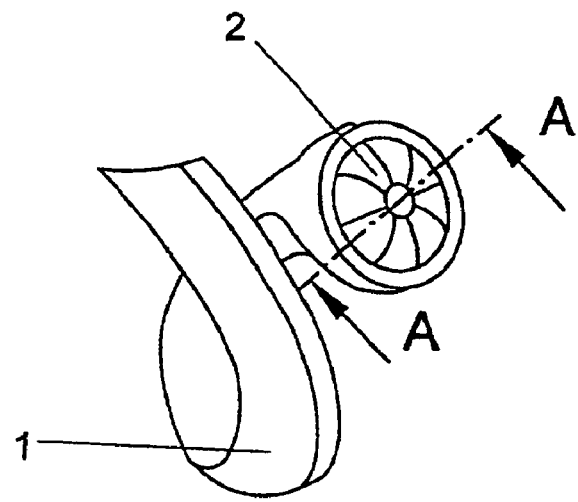
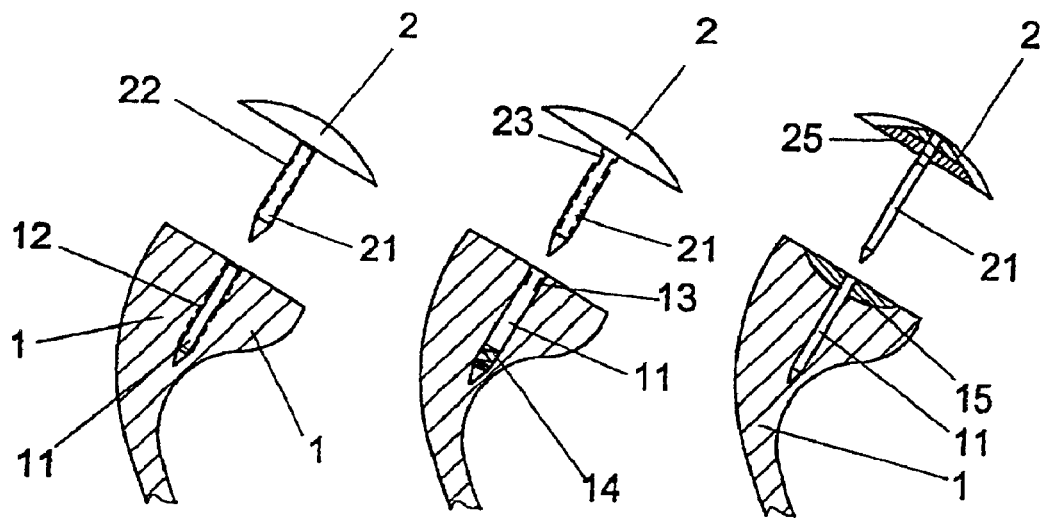
FIG. 1a    FIG. 1b    FIG. 1c

FIG. 2
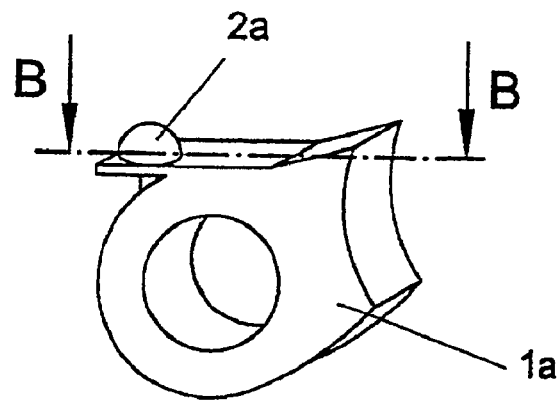
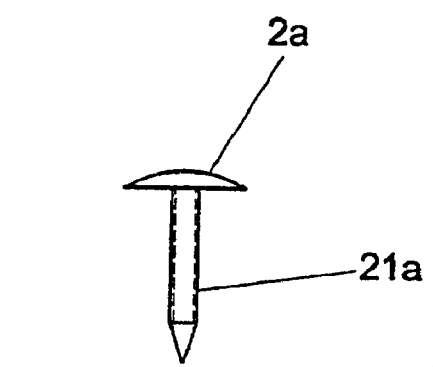
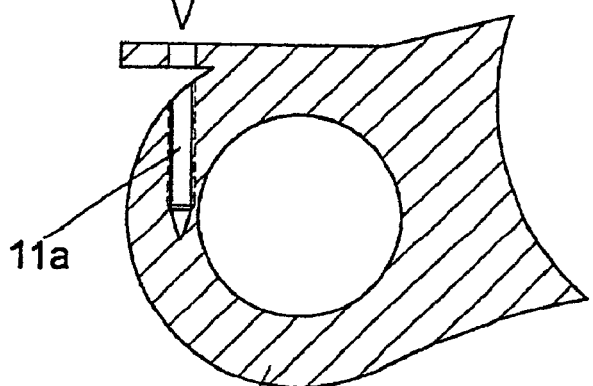
FIG.2a
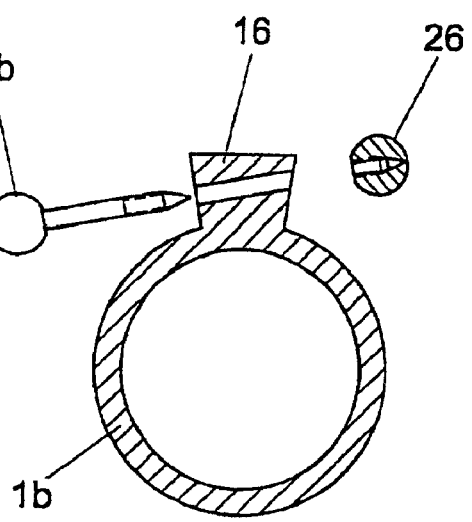
FIG.2b

SET OF JEWELRY

CROSS-REFERENCE TO RELATED APPLICATION

This application is a continuation of copending International Application No. PCT/IB00/01068, filed Jun. 28, 2000, which designated the United States.

BACKGROUND OF THE INVENTION

FIELD OF THE INVENTION

The present invention relates to a set of jewelry and the like which contains at least one ring and a plurality of stud earrings as well as other pieces of jewelry, preferably a necklace and a bangle. It is thereby possible for the stud earrings to be inserted into a piece of jewelry.

Known pieces of jewelry are designed as rings, necklaces, bangles and the like. Furthermore, pieces of jewelry are also designed as stud earrings. Known pieces of jewelry or stud earrings in this case are only ever in the form of individual elements which, although they can be used together, cannot be combined to form a single piece of jewelry. It is thus also the case that it is not possible to change the appearance of pieces of jewelry, e.g. in order thereby to match them with stud earrings.

SUMMARY OF THE INVENTION

It is accordingly an object of the invention to provide a jewelry set and stud earrings, which overcomes the above-mentioned disadvantages of the heretofore-known devices and methods of this general type and which makes it possible for individual pieces of jewelry to be changed using stud earrings belonging to the set, as a result of which it is made possible, in particular, to match pieces of jewelry with one another such that they each contain a coinciding element.

With the foregoing and other objects in view there is provided, in accordance with the invention, a jewelry set, comprising:

at least one first piece of jewelry selected from the group consisting of a ring, a necklace, a bangle, a brooch, a clip earring, and a jewelry attachment, having a bore formed therein with a minimum depth of 8 mm;

a plurality of stud earrings formed with a stud to be inserted and releasably retained in the bore of the first piece of jewelry.

In accordance with an added feature of the invention, the plurality of stud earrings include earrings of mutually different designs.

In accordance with an additional feature of the invention, the jewelry attachment is configured for attachment to a wrist watch.

In accordance with another feature of the invention, there is provided a wristwatch formed with at least one bore for receiving and retaining therein a stud of a respective one of the plurality of stud earrings.

In accordance with again an added feature of the invention, there is provided a pair of eyeglasses formed with least one bore for receiving and retaining therein a stud of a respective one of the plurality of stud earrings.

In accordance with again another feature of the invention, the studs of the stud earrings are threaded pins, and the bore in the first piece of jewelry is a threaded bore.

In accordance with a concomitant feature of the invention, the stud earrings is releasably fastened in the bore by one or more elements selected from the group consisting of a mechanical lock, a bayonet closure, interacting resilient elements, clip elements, piercing closures, screw-connection parts, and magnetic elements.

In other words, the objects are achieved according to the invention in that the set contains in each case a plurality of stud earrings of different types, and in that the at least one ring and the other pieces of jewelry, such as the necklace and the bangle, are each designed with at least one bore which has a minimum length of 8 mm and into which one of the stud earrings can be inserted and is retained releasably therein.

The set preferably additionally contains a brooch or a clip earring, which are designed with at least one bore into which one of the stud earrings can be inserted. Furthermore, it may also contain a wristwatch which is designed with at least one bore into which one of the stud earrings can be inserted. In addition, the set may also contain a pair of glasses which is designed with at least one bore into which one of the stud earrings can be inserted.

For the releasable fastening of the stud earrings in the pieces of jewelry or the like, it is possible for the pins of the stud earrings to be designed as threaded pins and for the bores provided in the pieces of jewelry and the like to be designed as threaded bores. Alternatively, it is also possible to provide mechanical fastening elements, such as bayonet closures or resilient elements, so-called clips, as well as so-called piercing fasteners and also magnetic closures, by means of which the pins of the stud earrings are retained releaseably in the bores of the pieces of jewelry and the like.

Other features which are considered as characteristic for the invention are set forth in the appended claims.

Although the invention is illustrated and described herein as embodied in a set of jewelry, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a perspective view of a ring into which a stud earring has been inserted;

FIGS. 1a, 1b and 1c are sectional views taken along the line A—A in FIG. 1 showing the ring with different methods of fastening the stud earring;

FIG. 2 is a perspective view of a second ring into which a stud earring has been inserted;

FIG. 2a is a sectional view taken vertically through the line B—B in FIG. 2;

FIG. 2b is a sectional view through a third ring into which a stud earring has been inserted;

DESCRIPTION OF THE PREFERRED EMBODIMENTS

Figure 3:
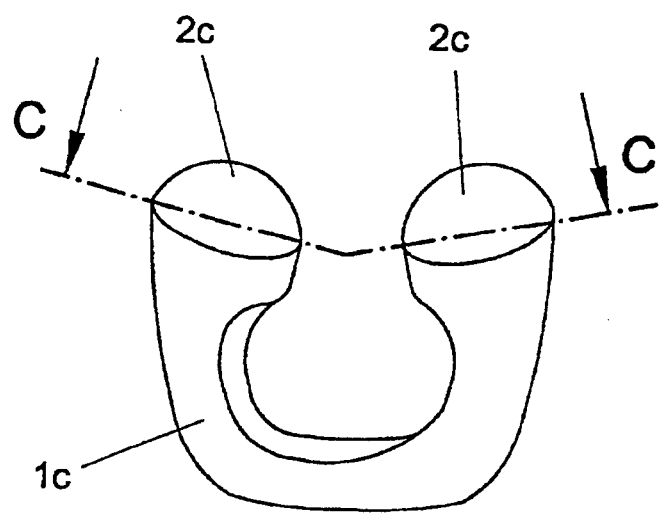
FIG. 3 is a sectional view of a fourth ring into which two stud earrings have been inserted.

Referring now to the figures of the drawing in detail and first, particularly, to FIG. 1 thereof, there is shown a ring 1 into which a stud earring 2 has been inserted. As can be seen from FIGS. 1a, 1b and 1c, the ring 1 is designed with a bore 11 into which the pin 21 of the stud earring 2 can be inserted.

According to the exemplary embodiment of FIG. 1a, the bore 11 is designed with a thread 12 and the pin 21 is likewise designed with a thread 22, as a result of which the stud earring 2 can be screwed into the bore 11 of the ring 1.

According to the exemplary embodiment of FIG. 1b, the bore 11 is designed with coupling elements 13 in the manner of a bayonet closure, and a helical compression spring 14 is located in said bore, and the pin 21 is likewise designed with coupling elements 23.

According to the exemplary embodiment of FIG. 1c, the ring is designed with a first magnetic element and the stud earring 2 is designed with a second magnetic element 25, the two elements interacting with one another.

It is thus possible for the stud earring 2 to be retained in the ring 1 by screw-connection, by locking or by magnetic force. Alternatively, it is also possible for the pin 21 to be fastened in the bore 11 by means of resilient elements, so-called clip elements, which are provided in the bore or on the pin.

FIGS. 2 and 2a illustrate a second ring 1a, which is likewise designed with a bore 11a into which a stud earring 2a can be inserted. In the illustration, the bore 11a and the pin 21a of the stud earring 2a are designed with a thread. It is also possible here for the stud earring 2a to be fastened in the bore 11a of the ring 1a by means of a coupling in the manner of a bayonet closure, by means of resilient elements or by means of magnetic elements.

FIG. 2b illustrates a third ring 1b, which is designed with an extension 16 which is provided with a bore and into which a stud earring 2b can be inserted. In this case, the pin of the stud earring 2b is designed with a thread and the stud earring 2b is assigned a screw-connection element 26 which can be screwed onto the pin of the stud earring, as a result of which the stud earring 2b can be fastened on the ring 1b.

Figure 3A:
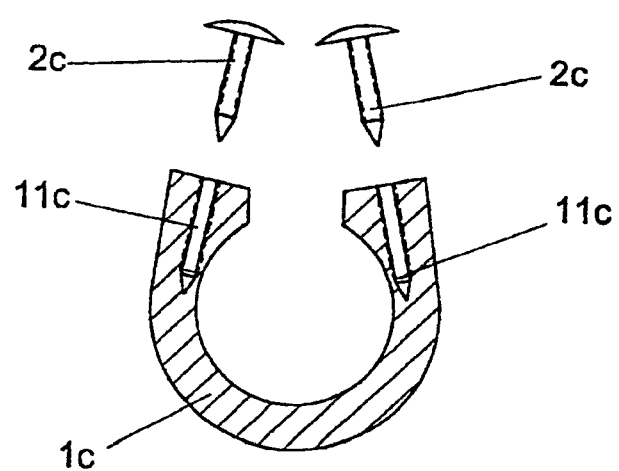
FIG. 3a is an exploded sectional view taken along the line C—C, with the stud earrings just outside the insertion openings.

FIGS. 3 and 3a illustrate a fourth ring 1c, which is designed with two bores 11c into which two stud ear rings 2c can be screwed. It is also possible here for the stud earring 2c to be fastened in the ring 1c by means of couplings in the manner of bayonet closures, by means of resilient elements or by means of magnetic closures.

Figure 4:
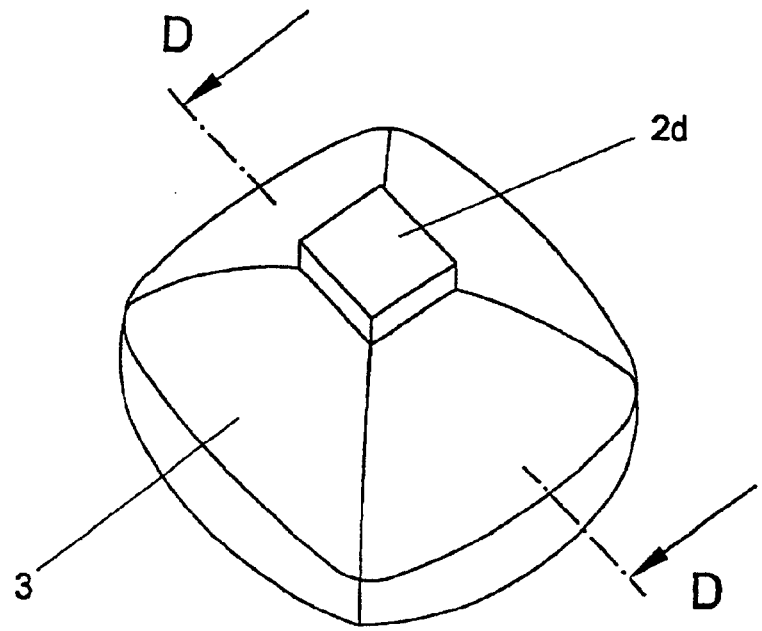
FIG. 4 is a perspective view of a brooch into which a stud has been inserted.
Figure 4A:
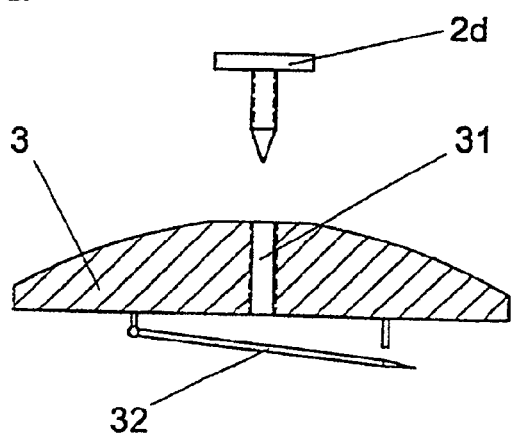
FIG. 4a is a sectional view of the brooch of FIG. 4 taken along the line D—D and showing the stud earring just outside the insertion opening.

FIGS. 4 and 4a illustrate a brooch 3 which can be fastened on an item of clothing by means of a closure pin 32. This brooch 3 is also designed with a bore 31 into which a stud earring 2d can be inserted and fastened therein.

Figure 5:
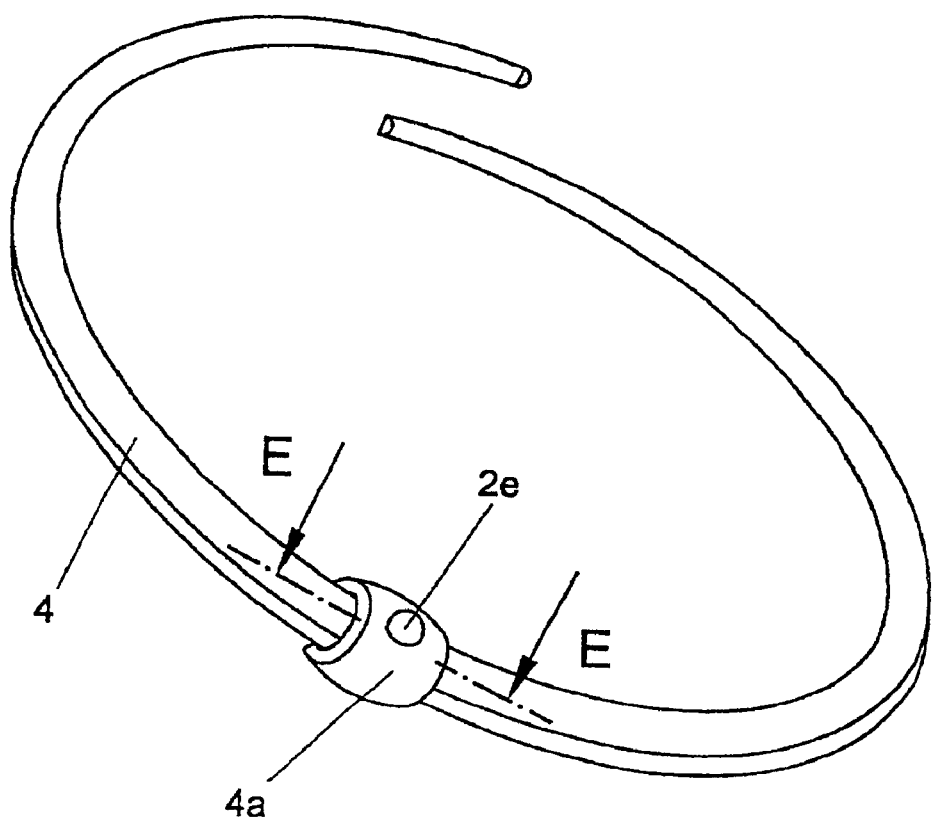
FIG. 5 is a perspective view of a necklace into which a stud earring has been inserted.
Figure 5A:
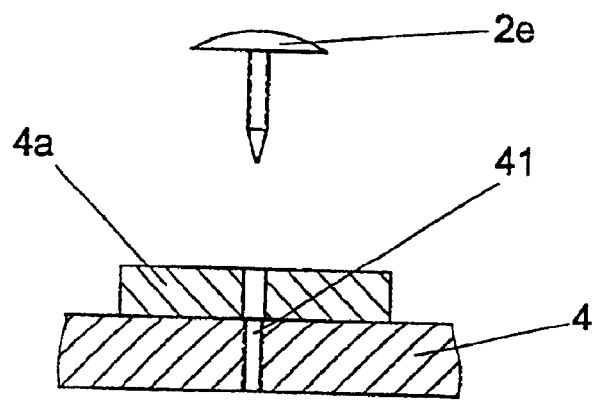
FIG. 5a is a related sectional view taken along the line E—E in FIG. 5, with the earring just outside the insertion opening.

FIGS. 5 and 5a illustrate a necklace 4 which is designed with a cylindrical element 4a which is provided with a bore 41 into which a stud earring 2e can be inserted and fastened therein.

Figure 6:
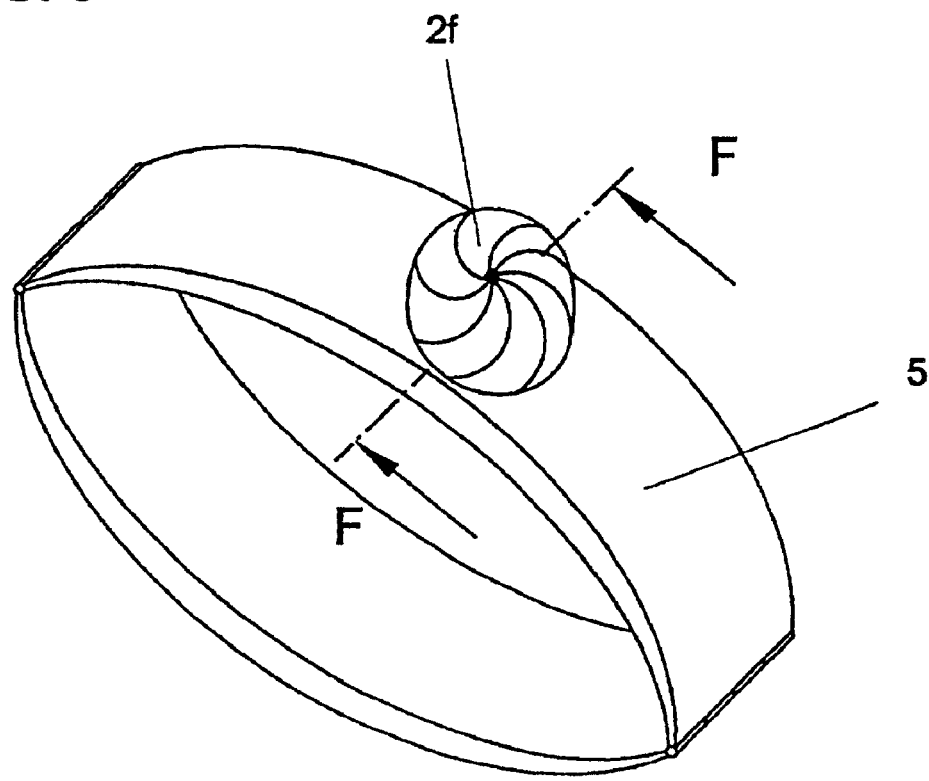
FIG. 6 is a perspective view of a bangle into which a stud earring has been inserted.
Figure 6A:
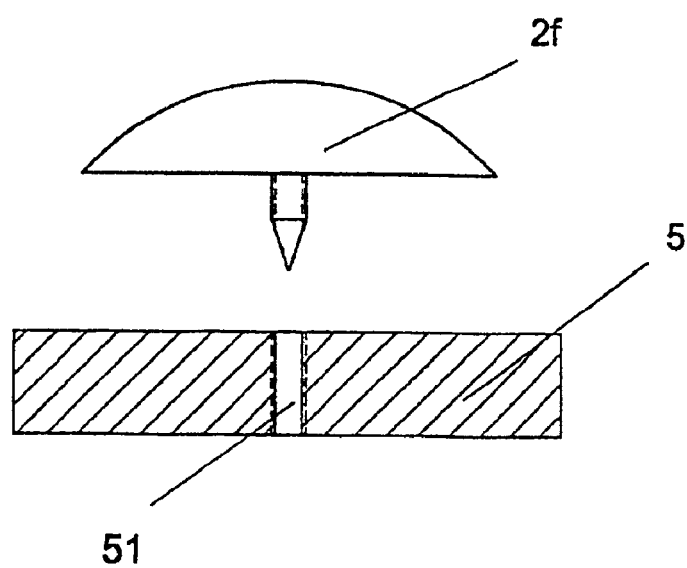
FIG. 6a is a related sectional view taken along the line F—F in FIG. 6, with the stud just outside the insertion opening.

FIGS. 6 and 6a illustrate a bangle 5 which is likewise designed with a bore 51 into which a stud earring 2f can be screwed.

Figure 7:
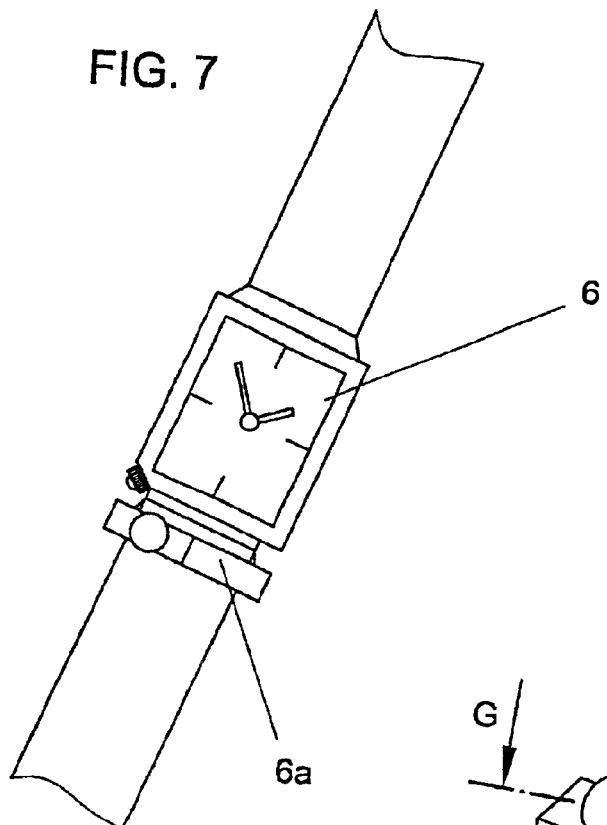
FIG. 7 is a plan view onto a watch with a decorative element into which a stud earring has been inserted.
Figure 7A:
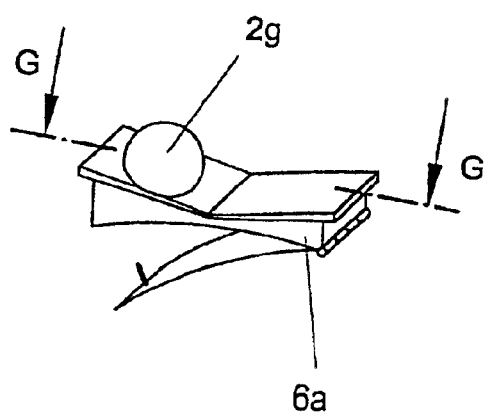
FIG. 7a is a perspective view of the decorative element with the stud inserted.
Figure 7B:
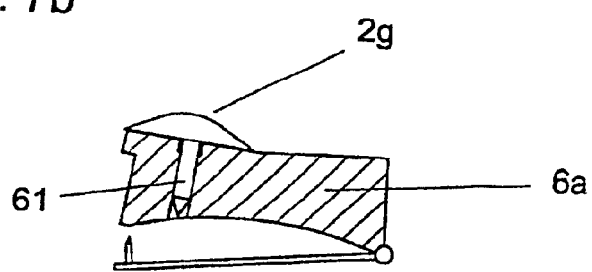
FIG. 7b is a sectional view of the jewelry element taken along the line G—G.

FIGS. 7, 7a and 7b illustrate a wristwatch 6 which is designed with a jewelry element 6a. The jewelry element 6a here is designed with a bore 61 into which a stud earring 2g can be inserted.

Figure 8:
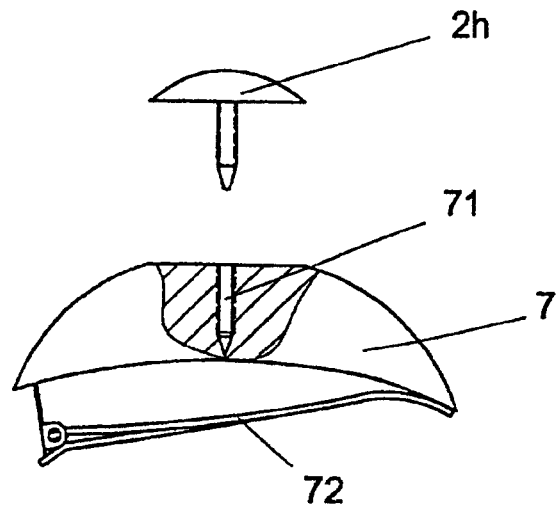
FIG. 8 is a side view, partly broken away, of a clip earring.

FIG. 8 illustrates a clip earring 7 which is likewise designed with a bore 71 into which a stud earring 2h can be inserted. The clip earring 7 is fastened by means of a pivoting clip 72 which is subjected to the action of a spring.

Figure 9:
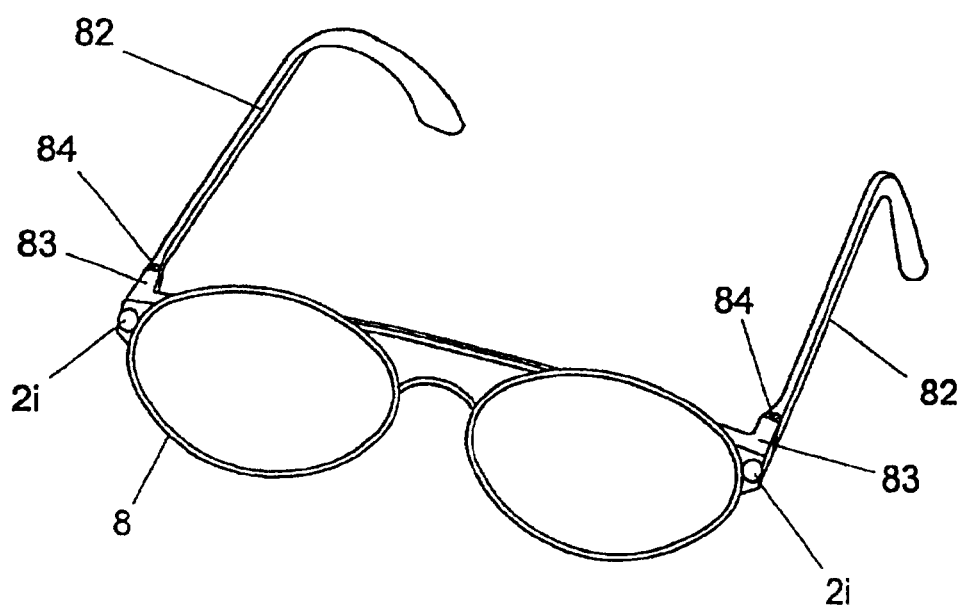
FIG. 9 is a perspective view of a pair of glasses.

FIG. 9 illustrates a pair of glasses 8 which, in the two lateral regions 83 on which the side legs 82 of the glasses are articulated by means of a hinge 84, are likewise designed with bores into which stud earrings 21 can be inserted.

The stud earrings may be fastened releasably in the bores of the pieces of jewelry or the like in each case by screw-connection, by mechanical locking in the manner of a bayonet closure, by means of resilient elements, so-called clip elements, by means of so-called piercing fasteners, by means of screw-connection elements, by means of magnetic elements or in any other desired manner. The essential factor is for the bores in the case of the jewelry elements, it being possible for these bores to be designed as open through-passage bores or blind bores, each to have a minimum length of approximately 8 mm, with the result that a stud earring can be inserted into them.

We claim:

1. A jewelry set, comprising:
   a plurality of mutually different first pieces of jewelry selected from the group consisting of a ring, a necklace, a bangle, a brooch, an earring, and a jewelry attachment, each having a bore formed therein with a minimum depth of 8 mm;
   at least one stud earring formed with a stud configured to be selectively inserted and releasably retained in any of said bores of any of said plurality of mutually different first pieces of jewelry, or worn as a stud earring independently of the respective said first piece of jewelry.

2. The jewelry set according to claim 1, wherein said stud earring is one of a plurality of stud earrings including earrings of mutually different designs.

3. The jewelry set according to claim 1, wherein said jewelry attachment is configured for attachment to a wrist watch.

4. The jewelry set according to claim 1, wherein said stud of said stud earring is a threaded pin, and said bore in said first piece of jewelry is a threaded bore.

5. The jewelry set according to claim 1, wherein a respective said stud earring is releasably fastened in said bore by one or more elements selected from the group consisting of a mechanical lock, interacting resilient elements, clip elements, piercing closures, screw-connection parts, and magnetic elements.

6. The jewelry set according to claim 1, wherein said stud has a minimum length of 8 mm.

7. A jewelry set, comprising:

a plurality of pieces of jewelry selected from the group consisting of a ring, a necklace, a bangle, a brooch, an earring, and a jewelry attachment, each having a bore formed therein with a minimum depth of 8 mm;

a wristwatch formed with at least one bore; and a plurality of stud earrings formed with a stud to be selectively worn as a stud earring independently of said wristwatch and said pieces of jewelry or inserted and releasably retained in said bore of said wristwatch or any of said pieces of jewelry.

8. The jewelry set according to claim 7, wherein said stud has a minimum length of 8 mm.

9. The jewelry set according to claim 7, wherein said bore has a minimum depth of 8 mm.

10. A jewelry set, comprising:

a plurality of pieces of jewelry selected from the group consisting of a ring, a necklace, a bangle, a brooch, an earring, and a jewelry attachment, each having a bore formed therein with a minimum depth of 8 mm;

a pair of eyeglasses formed with at least one bore; and a plurality of stud earrings each formed with a stud to be selectively worn as a stud earring independently of said pair of eyeglasses and said pieces of jewelry or inserted and releasably retained in said bore of said pair of eyeglasses or any of said pieces of jewelry.

11. The jewelry set according to claim 10, wherein said stud has a minimum length of 8 mm.

12. The jewelry set according to claim 10, wherein said bore has a minimum depth of 8 mm.

* * * * *